United States Patent [19]

Harbaugh

[11] 4,312,590

[45] Jan. 26, 1982

[54] OPTICAL SCANNER AND SYSTEM FOR LASER BEAM EXPOSURE OF PHOTO SURFACES

[75] Inventor: Steven K. Harbaugh, Anaheim, Calif.

[73] Assignee: Eocom Corporation, Irvine, Calif.

[21] Appl. No.: 941,763

[22] Filed: Sep. 13, 1978

Related U.S. Application Data

[63] Continuation of Ser. No. 805,445, Jun. 10, 1977, abandoned.

[51] Int. Cl.³ .................... G03B 27/48; G03B 27/50; G03B 27/70
[52] U.S. Cl. ........................ 355/51; 350/6.7; 350/486; 358/206; 358/293
[58] Field of Search .................. 350/285, 6.5, 6.7; 358/206, 285, 293, 109, 113; 250/236, 563, 347, 285; 356/28; 355/51, 8, 66; 346/108

[56] References Cited

U.S. PATENT DOCUMENTS

| | | | |
|---|---|---|---|
| 3,487,224 | 12/1969 | Beckmann | 250/236 |
| 3,866,038 | 2/1975 | Korth | 250/236 |
| 4,084,092 | 4/1978 | Runciman | 250/347 |

FOREIGN PATENT DOCUMENTS 1464446  2/1977  United Kingdom .

*Primary Examiner*—Richard A. Wintercorn
*Attorney, Agent, or Firm*—Flehr, Hohback, Test, Albritton & Herbert

[57] ABSTRACT

Optical scanning apparatus including a rotating pyramidal mirror scanning wheel with reflector segments for deflecting a laser beam into and away from a doublet mirror roof reflector associated with said scanning wheel. The scanning wheel introduces components of vertical and horizontal angular deviation into the beam, the vertical deviation component being cancelled by inversion through the roof reflector while the horizontal angular component is doubled upon the second reflection from the scanning wheel so that the output beam is vertically wobble-free and stable while the beam is scanned through the sum of the horizontal angular components introduced by the wheel. The scanner is employed to create a flying spot scan from a laser beam in photosensitive plate exposure apparatus, one form of which employs superimposed laser read and expose (write) beams of different frequencies which are simultaneously scanned without chromatic aberration, and subsequently separated to ready copy and to expose a photosensitive plate surface as in the production of printing plates.

29 Claims, 19 Drawing Figures

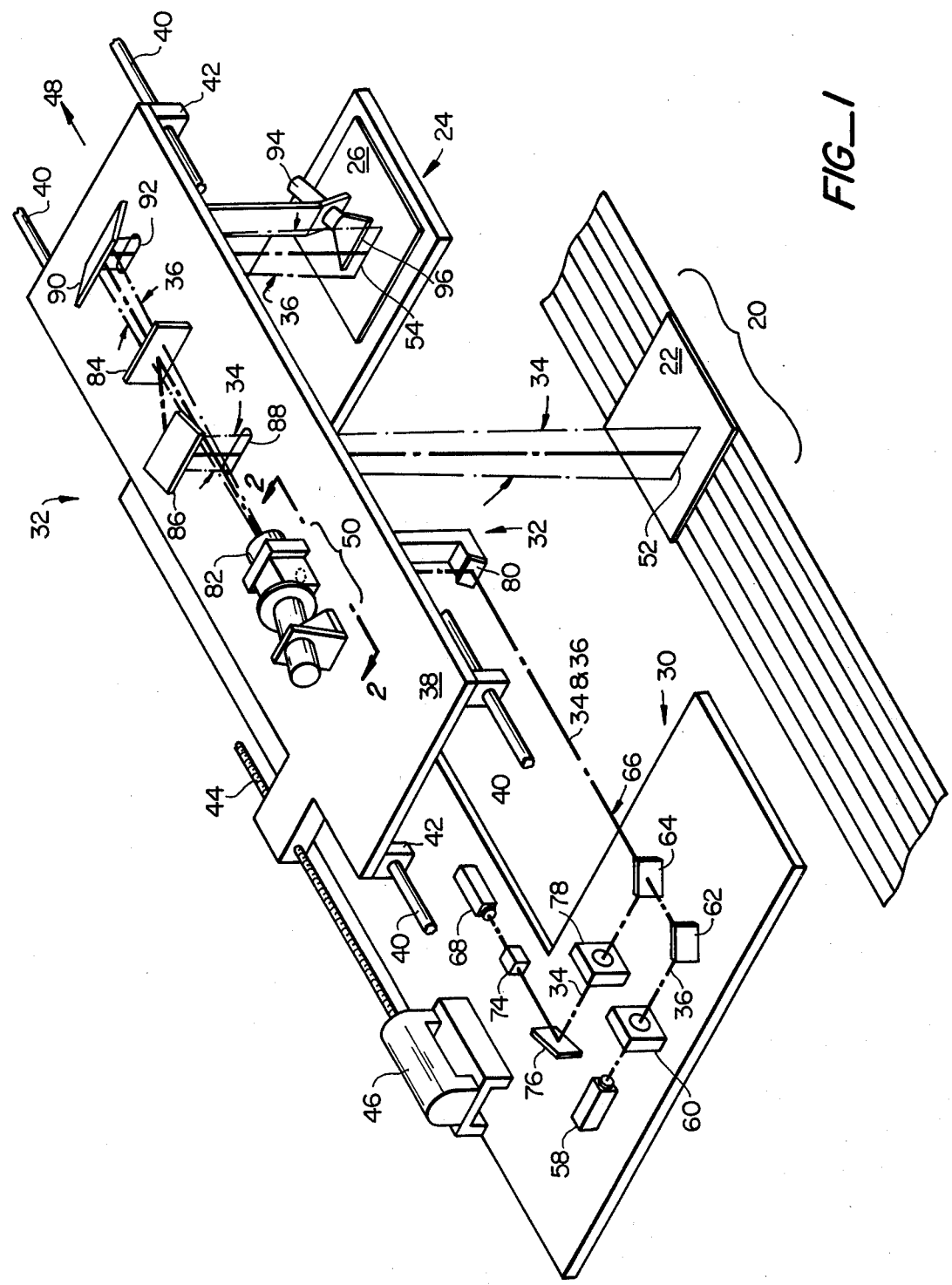
FIG_1

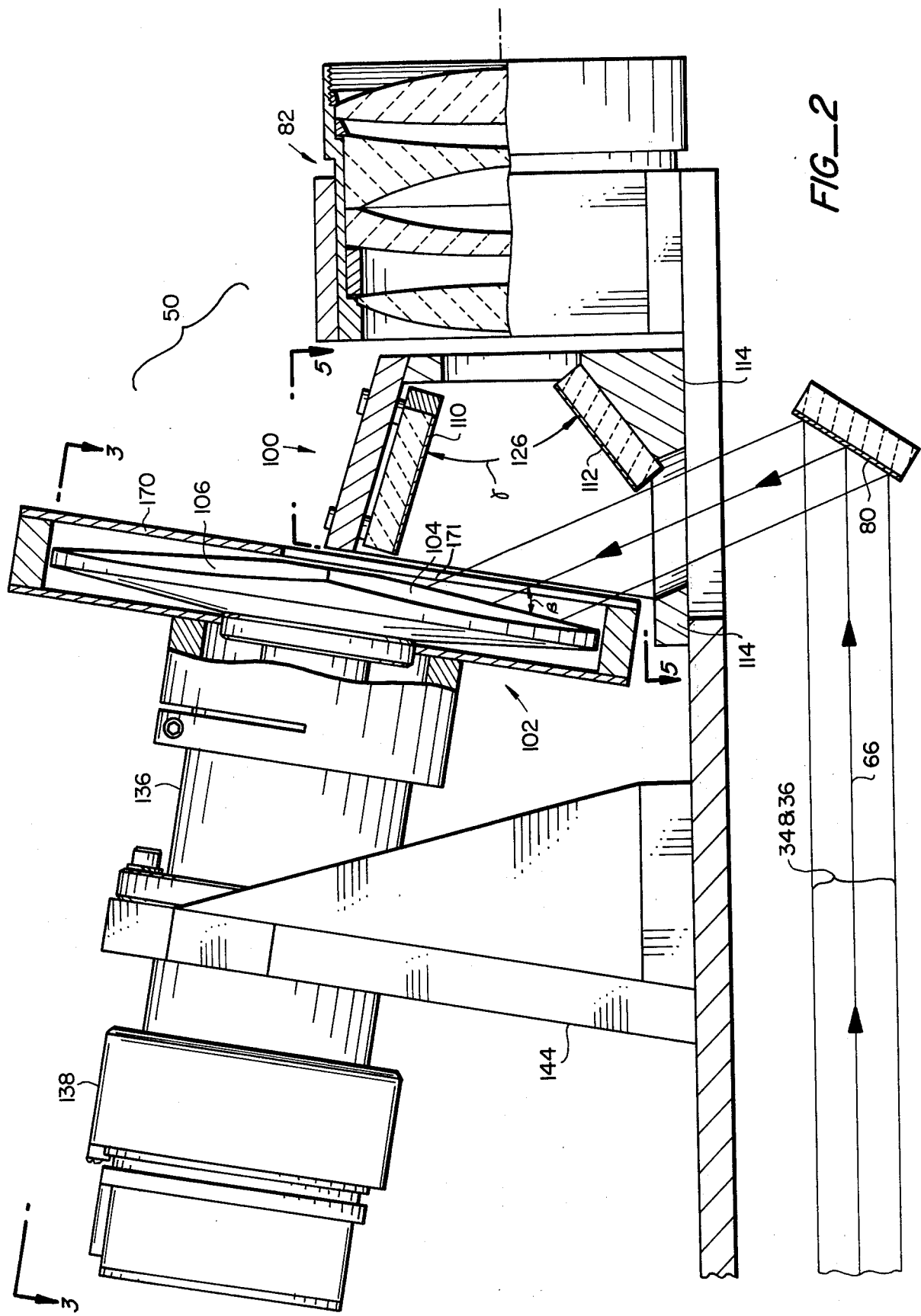

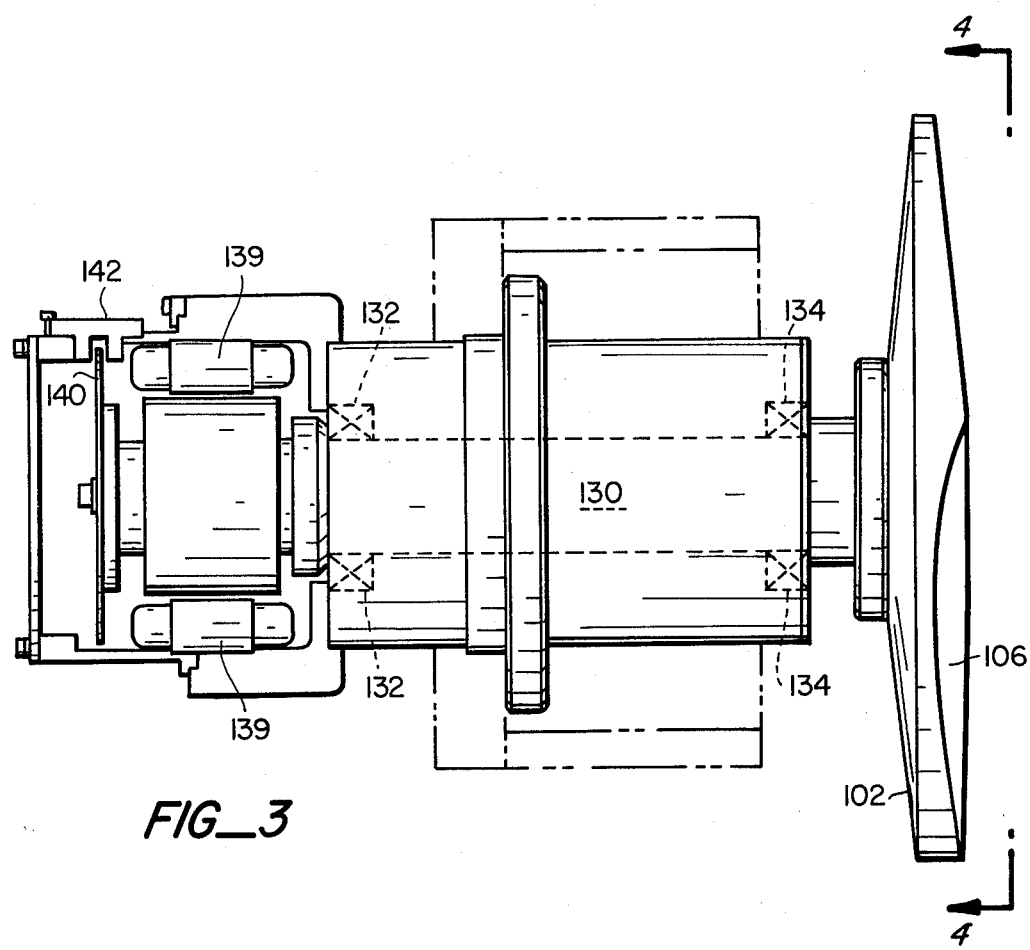
FIG_3
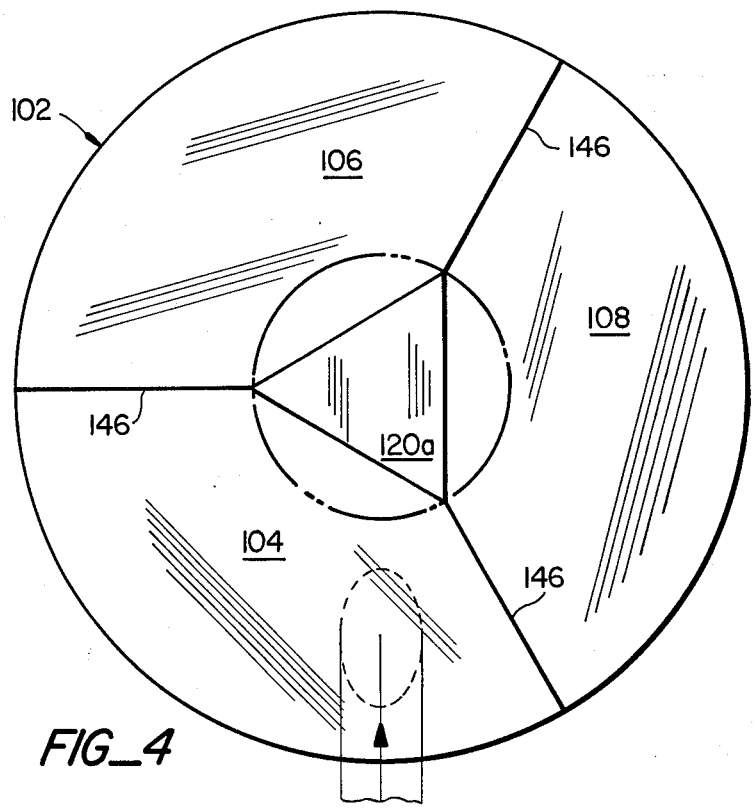
FIG_4

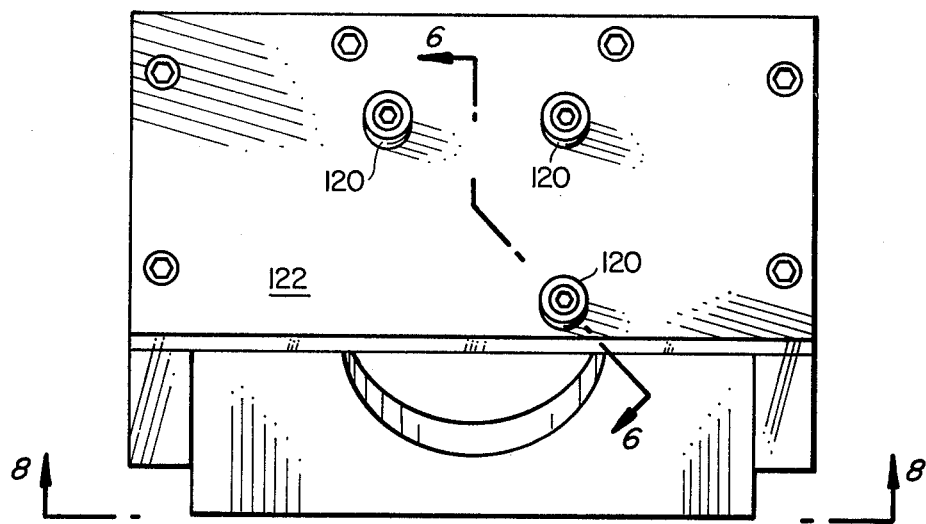
*FIG_5*
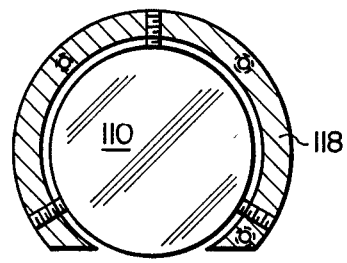
*FIG_7*
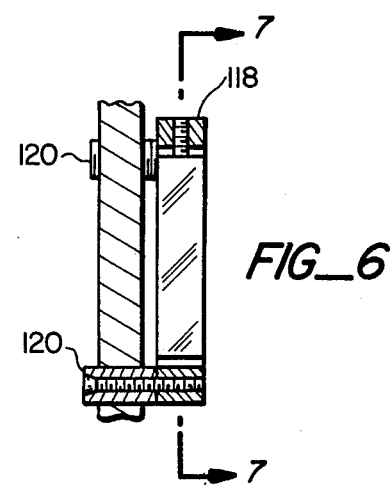
*FIG_6*
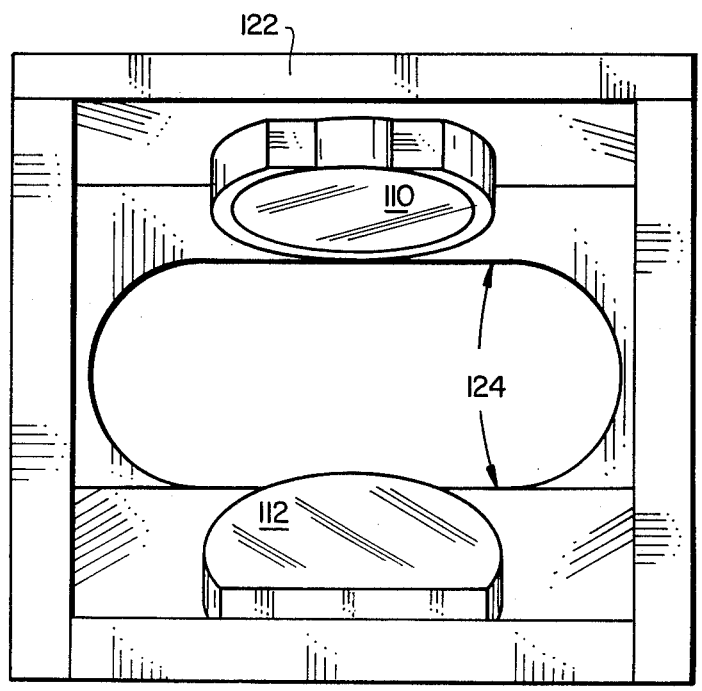
*FIG_8*

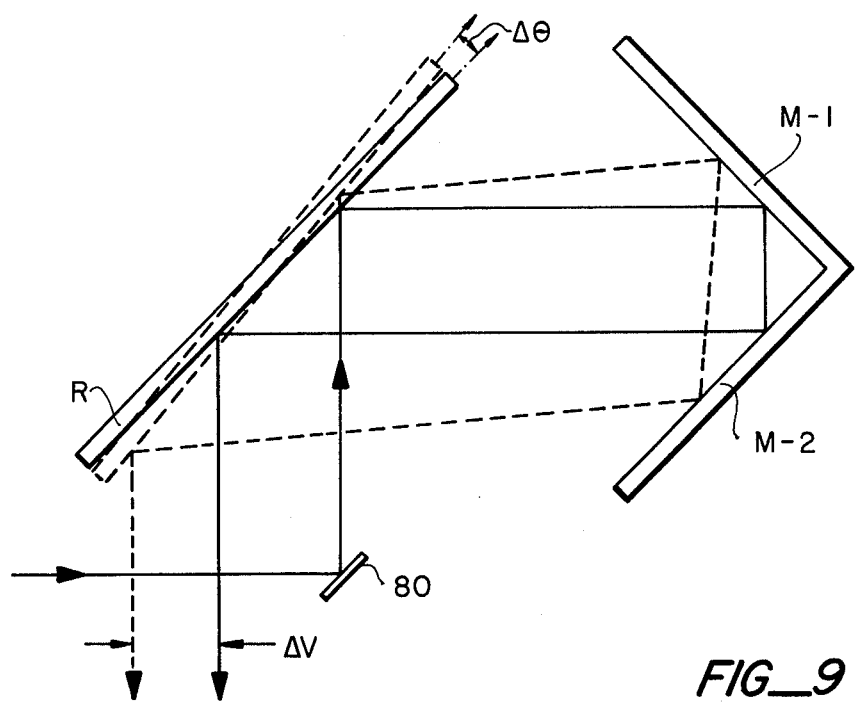
FIG_9
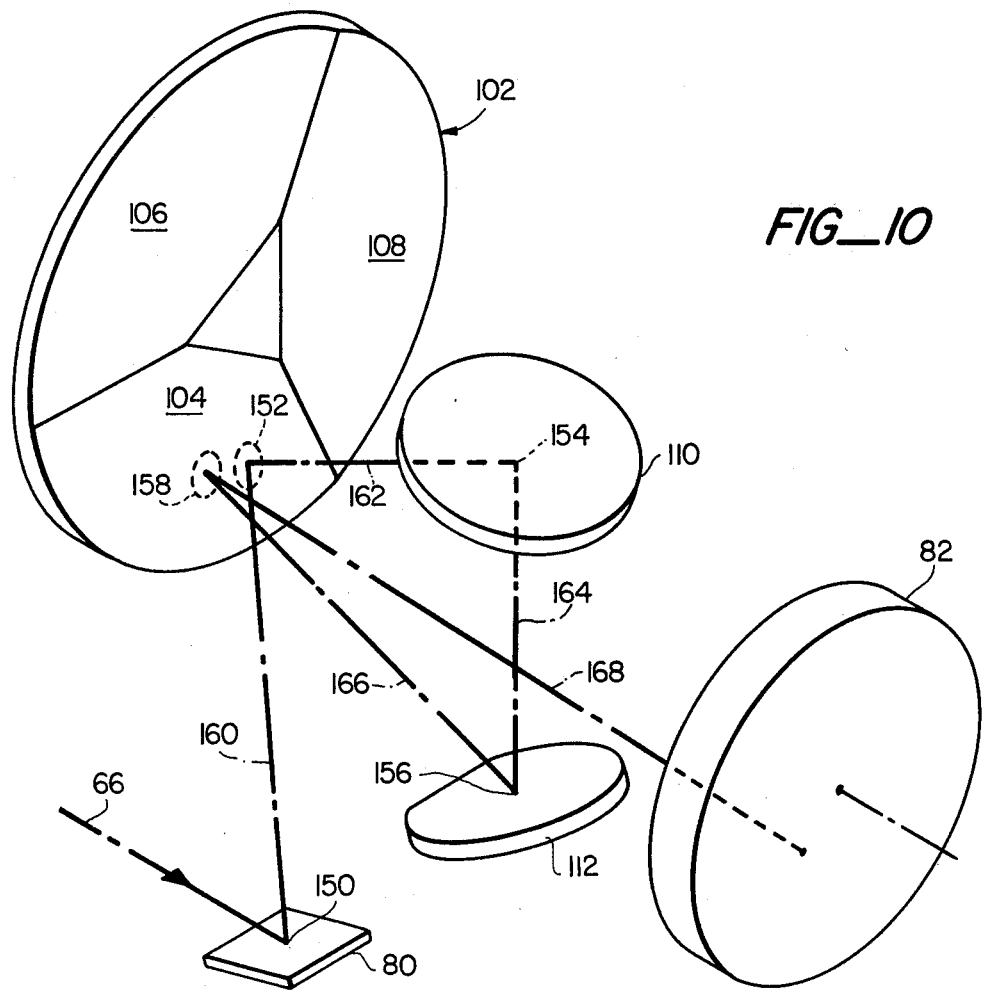
FIG_10

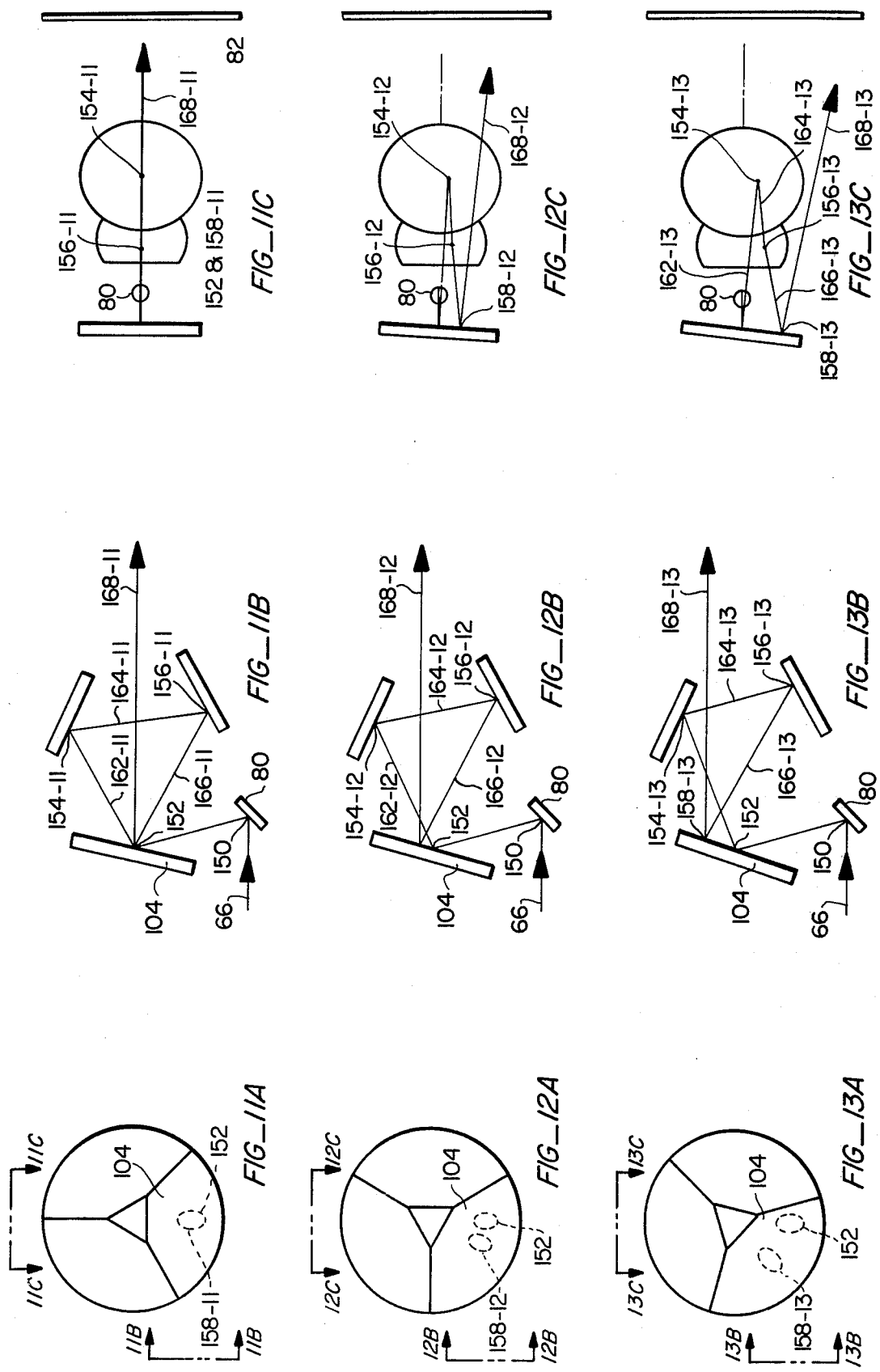

OPTICAL SCANNER AND SYSTEM FOR LASER BEAM EXPOSURE OF PHOTO SURFACES

CROSS REFERENCE TO RELATED APPLICATIONS

This is a continuation of application Ser. No. 805,445, filed June 10, 1977, now abandoned. Reference is also made to application Ser. No. 522,103, filed Nov. 8, 1974 in the name of Richard E. Amtower and entitled LASER READ-WRITE SYSTEM FOR PRODUCTION OF ENGRAVINGS, now abandoned, and to application Ser. No. 605,921 filed June 14, 1976 in the names of Steven K. Harbaugh and Richard E. Amtower and entitled FACSIMILE SYSTEM, now U.S. Pat. No. 4,081,842, issued Mar. 28, 1978.

BACKGROUND OF THE INVENTION

This invention relates generally to optical scanners and more particularly to an optical scanner for creating a flying spot linear trace of a beam of laser light. The invention finds particular use in the field of laser beam scanners as are used for reading information from a copy board and directly transferring the read information for the exposure of photosensitive surfaces as in the production of printing plates.

In the aforementioned cross-referenced application Ser. No. 522,103, there is shown an apparatus for producing an exposed photo plate from a copy board paste-up. A laser scanning system having a read laser beam is focused to a spot scanned across the copy board in a predetermined pattern, such as a raster-like scan, the reflection from the copy board being sensed, read and used to control the intensity of a second laser beam via a modulator. The second laser beam impinges upon and scans a photosensitive surface. The read laser beam and the write laser beam are combined and passed through deflection optics, and the two beams are subsequently separated to impinge upon and be focused at the copy board and photosensitive surface, respectively. In this way there is a resultant exposure of the photosensitive surface in accordance with the copy. As shown in Ser. No. 522,103, the scanning optics employed utilizes a moving mirror galvanometer, with both the read and write laser beams being aligned and superimposed upon each other through suitable beam combining optics for being passed through the galvanometer simultaneously and subsequently separated by suitable beam deflection optics to the respective planes. Another optical system shown therein employs a polygonal scanning wheel having a plurality of surfaces parallel to the axis of rotation of the wheel, with the surfaces serving to scan the read and write beams through an angle, thereby creating a flying spot scan.

In the other cross-referenced application Ser. No. 695,921 there is disclosed a variation of laser read/write apparatus in which a facsimile system is enveloped. As disclosed therein, a duplication of read and write equipment at separate locations can be coordinated to form a facsimile transmission system. At the read station an optical scanner scans the input copy with the scanning spot and the reflected light produces a video read data signal, a portion of which is directed through a spatial mask to provide a transmitter video reference which gates a video read data before transmission. In the receiver, a second optical scanner of similar construction is controlled by a video write data signal. The video write data signal gates a scanning spot of exposure laser beam light on and off to expose the output photosensitive copy surface at the receiver. Additionally, the scanning light is detected through a further spatial mask to provide a receiver video reference signal utilized to form a video write signal. The spatial masks in the transmitter and receiver have a known relationship, e.g., so that the scanning of the output copy in the receiver can be spatially synchronized with the scanning of the input copy in the transmitter. As therein disclosed, each of the scanning optics includes a galvanometer-operated mirror for scanning the incident laser beam back and forth through a horizontal angle.

The foregoing instruments as disclosed in the cross-referenced application employ a field-flattening lens for causing the beam provided from the scanning device to be focused at the plane of the copy board and photosensitive surface respectively, and are known therefore as flat bed scanners. The scanning optics, however, are subject to a number of errors which degrade the performance of the system. In a polygonal drum scanning design, very close tolerances are required during the manufacturing processes so as to control facet-to-facet tilt. Any error in facet-to-facet orientation, together with bearing run-out errors and the like, contribute to produce an angular or positional error component normal to the scan line. This error has come to be known as "wobble" or vertical error. In addition, the scan efficiency of a polygonal drum scanning system is limited to about 50 percent. Accordingly, the polygonal design is expensive to produce due to the tolerances required, and the facet-to-facet error has to be removed by some suitable means, termed a "dewobbler".

In a resonant or oscillating galvanometer scanner, the mirror pivots in a sinusoidal manner, and only the center portion of the scan is linear enough to be utilized. This results in a scan efficiency of approximately 50% with a 25% deviation in exposure or scan velocity. However, it is necessary to scan back and forth in opposing directions in order to maintain this efficiency level. Such scanning requires lag compensation which is accomplished by deviating the read beam from its normal course as a function of system time delays and scan velocity. Such compensation adds to the cost and complexity of the system and in many instances is only partially effective. In addition, if multiple machines are to communicate in a facsimile system, a great deal of calibration of each machine is required to normalize the amount of lag produced in each machine. Lag errors and other errors in the facsimile process when scanning in both directions, result in left writing and right writing images that are no loner superimposed, resulting in severe image degradation for even small errors. Further, at the higher speeds particularly associated with facsimile systems, the scanner requirements exceed the capabilities of a galvanometer mirror system because of the high torque to which the mirror and its support structure are subjected.

Other existing systems utilize cylindrically curved fields but are also limited in scan efficiency. For example, in one such system using a spinner-type scanner in a cylindrical configuration, one scan is accomplished for each rotation of the scanning device. With the exposure times commonly associated with a standard printing format, extremely high rotational speeds are required, and synchronization of facsimile versions is difficult. Furthermore, such curved field systems require that the exposure surface be adaptable to a curved conformation which is often incompatible with printing plate production.

Ideally, a scanning system should provide a high scan efficiency, a scanning operation in a single direction so as to eliminate the problem of lag, and a constant scanning velocity so as to reduce the cost of the associated electronics. In addition, the system should be free of vertical error or wobble and should be entirely reflective so as to above aberration errors caused by the read and write beam frequencies being at different portions of the spectrum. Additionally, such a scanning system should be cmpatible with flat field optics so that the resulting flying spot scan can read copy and expose plates lying on plane surfaces.

OBJECTS AND SUMMARY OF THE INVENTION

In general it is an object of the invention to provide a laser beam optical scanning apparatus which will overcome the above limitations and disadvantages and supply error-free scanning within the foregoing guidelines.

It is a further object of the invention to provide an optical scanning apparatus of the above character which utilizes a rotating element and provides a resultant scan which is free of vertical error or wobble, which is compatible with flat field scanning, and which simultaneously has a substantially uniform scan velocity and high scan efficiency while operating in a single direction of scan.

It is a further object of the invention to provide a laser beam optical scanning apparatus of the above character which is inherently adaptable to extremely high scanning speeds.

Another object of the invention is to provide an optical scanner of the above character which is readily adapted to synchronous facsimile operation.

A further object of the invention is to provide a scanner of the above character which is designed for multiple-beam read/write operation utilizing beams of different frequencies without introducing chromatic aberration.

These and other objects are achieved in accordance with the invention by providing a pyramidal mirror having a plurality of reflective surfaces inclined at an acute angle relative to a plane perpendicular to the axis of the mirror. The mirror is rotated about its axis to move the reflective surfaces successively through the path of a beam to provide a varying deflection of the beam from each successive surface of the mirror as that surface moves through the path and presents a varying angle of incidence to the beam, and optical means such as a roof mirror doublet receives the deflected beam from each successive surface and returns an inverted image of the beam to the same surface for further reflection by that surface along an output path. As each segment rotates through the beam path, its varying angular orientation introduces horizontal and vertical components of angular deviation into the beam, with the horizontal angular component being doubled upon the second (output) reflection from the rotating segment while the vertical component is cancelled by the inversion provided by the roof mirror.

In a system for scanning reading and writing surfaces with laser beams, the beams are combined and the combined beam is deflected by the pyramidal mirror and the roof mirror doublet to produce the desired scanning action, following which the beams are separated and directed to the respective reading and writing surfaces.

BRIEF DESCRIPTION OF THE DRAWINGS

FIG. 1 is a diagrammatic perspective view of one embodiment of laser beam optical scanning apparatus constructed in accordance with the invention for reading a copy and exposing a photosensitive plate.

FIG. 2 is an elevational view, partly in cross-section, of the scanner assembly of the apparatus of FIG. 1, taken generally along the line 2—2 thereof.

FIG. 3 is a top plan view taken along the line 3—3 of FIG. 2.

FIG. 4 is a front face view of the scanning wheel of the apparatus of FIG. 1, taken along the line 4—4 of FIG. 3.

FIG. 5 is a top view of a roof doublet mirror assembly of the scanner of FIG. 1, taken along the line 5—5 of FIG. 2.

FIG. 6 is a cross-sectional view of the upper mirror of the doublet mirror assembly, taken along the line 6—6 of FIG. 5.

FIG. 7 is a cross sectional view taken along the line 6—6 of FIG. 5.

FIG. 8 is a front, or input, view of the doublet mirror assembly taken along the line 8—8 of FIG. 5.

FIG. 9 is a diagrammatic view illustrating the principle by which vertical angular deviation is removed from the beam as it passes through the roof mirror doublet assembly.

FIG. 10 is a perspective diagrammatic view illustrating the scanner portion of the invention and showing a ray trace of the principal beam path therethrough at an intermediate angle of orientation of the scanner wheel.

FIG. 11A is a front view of the scanner wheel of FIG. 1 illustrating a beam impinging on one segment of the wheel when that segment is at the mid-position of its travel through the input beam path.

FIG. 11B shows a beam trace in a vertical plane taken along the line 11B—11B of FIG. 11A.

FIG. 11C shows a top plan, or horizontal plane, ray trace of the beam of FIG. 11A taken along the line 11C—11C thereof.

FIG. 12A is a front view of the scanner wheel of FIG. 1 illustrating a beam impinging on one segment of the wheel when that segment is at an intermediate position in its travel through the input beam path.

FIG. 12B shows a beam trace in a vertical plane taken along the line 12B—12B of FIG. 12A.

FIG. 12C shows a top plan, or horizontal plane, ray trace of the beam of FIG. 12A taken along the line 12C—12C thereof.

FIG. 13A is a front view of the scanner wheel of FIG. 1 illustrating a beam impinging on one segment of the wheel when that segment is near the end of its travel through the input beam path.

FIG. 13B shows a beam trace in a vertical plane taken along the line 13B—13B of FIG. 13A.

FIG. 13C shows a top plan, or horizontal plane, ray trace of the beam of FIG. 13A taken along the line 13C—13C thereof.

DETAILED DESCRIPTION OF THE PREFERRED EMBODIMENT

Referring now to FIGS. 1 and 2 there is shown a laser read/write system constructed in accordance with the invention which includes a station 20 defining a support for an exposure or write platen 22 and another station 24 defining a support for a read platen 26. The exposure platen receives a photosensitive plate at 22 which will be scanned by the apparatus to be described and thereby exposed for subsequent development into a printing plate. The copy to be read is positioned on the read platen 26. A laser beam station 30 is provided, the output of which is directed through a scanning system 32 and redirected thereby to cause write beam 34 and read beam 36 to scan across the respective platens. The scanning system 32 includes a table 38 supported on a linear transport mechanism including parallel guides 40 engaged in a predetermined direction, as indicated at 48. The table is driven by a lead screw 44 and rotary motor drive 46 which may conveniently be disposed on a suitable apparatus framework (not shown) so that the laser beam station and platens remain substantially fixed in space while the scanning table moves along the direction indicated at 48.

The table carries a horizontal scanning subsystem 50 (FIG. 2) constructed in accordance with the invention which shifts the beam from side to side (horizontally) as the table is carried forward to thereby develop raster scans 52,54 of the laser beams across both the read and exposure platens.

Means is provided for generating the read laser beam 36 and consists of a helium-neon (He/Ne) laser 58 having an output at 6,328 angstroms in the red portion of the visible spectrum which is then passed through a beam expander and collimator 60 and turning mirror 62 for developing the same into a collimated beam along a predetermined path 66 passing through a dichroic beam combiner 64 having surfaces selectively transmissive to 6,328 angstroms.

Means is provided for providing an exposure laser beam which is actinic to the photosensitive surface of the exposure plate carried at platen 22. One typical system utilizes an argon ion laser 68 having an output beam 34 at 4,880 angstroms in the blue portion of the spectrum at a power output of about 10 milliwatts. This output beam is passed through an acousto-optical modulator 74 which controls the intensity of the beam transmitted therethrough. Beam 34 is routed by a turning mirror 76 through a beam expander and collimator 78 to the dichroic beam combiner 67. The beam combiner reflects beam 34 along path 66 and thereby combines it with read beam 36. The combined beams pass along the common path to a turning mirror 80 carried on the scan table and then to the scanning apparatus 50. As indicated in FIG. 1, the scanning apparatus serves to deflect the combined beams through a horizontal angle to ultimately scan the beams across the respective surfaces of read platen 26 and write platen 22. A flat field lens 82 serves to focus the scanning beams at the surfaces of the respective platens. After passing through lens 82, the combined beams pass to a dichroic beam splitter 84 which reflects the blue actinic write beam 34 upwardly to a turning mirror 86 and thence downwardly through an aperture 88 in the table to exposure platen 22. The dichroic beam splitter 84 (similar to combiner 64) passes the red read beam 36 to a folding mirror 90 which directs the beam downwardly through a second aperture 93 in the scanning table to impinge upon copy at read platen 26.

An optical reader 94 is carried by the scanning table for receiving read beam energy reflected by the copy on platen 26. The reader comprises a fiber optic bundle 96 which includes fibers arranged in elongated linear array extending across the width of the copy to be scanned. The output of the fiber optic reader is directed to a photomultiplier tube (not shown) and converted to an electrical signal which controls the intensity of the output of modulator 74.

Referring now to FIGS. 2-8, the optical scanner 50 will be described in greater detail. In general, the scanner consists of a roof mirror assembly 100 to which is optically coupled a generally pyramidal input/output scanning wheel 102 having mirror segments 104,106,108 thereon which progressively move through the path of the input laser beam and cause the same to be deflected, as will be described. The input turning mirror 80, which is mounted on the underside of the scanning table 38, is positioned to intercept the combined laser beam 66 from the laser table 30 and to deflect the same upwardly to the scanning wheel 102. The beam is then reflected by one of the mirror segments 104,106 or 108 toward a first mirror 110 of the roof mirror assembly 100, then to a second mirror 112 of the roof mirror assembly 100, and then back to the same wheel segment 104,106 or 108 from which it was reflected initially. After the second reflection from the wheel segment, the beam passes to an output objective lens 82. The angles of reflection of the respective wheel segment, roof mirrors 110,112 and turning mirror 80 define the vertical orientation of the beam as it emerges from the scanner.

Means is provided for mounting the roof mirrors 110 and 112 in spaced relation to each other and includes a framework 116 and a base 114 to which the lower mirror 112 is cemented. The upper mirror 110 is carried in a support ring 118 which is adjustable in angular orientation by a 3-point suspension consisting of suitable differential screws 120 through an upper crosspiece 122 so as to permit accurate alignment between the mirrors. As shown, mirrors 110 and 112 are spaced apart with a scan output opening 124 between them from which the emerging scan beam is directed into the objective lens 82. Mirrors 110 and 112 are positioned with an included angle 126 of about 55.8 degrees. It can be shown that the total angle through which the beam is turned is 360 degrees, including the reflection by the turning mirror 80, the two reflections by the scanning wheel 102, and the reflections by the two roof mirrors 110 and 112. These angles define a fixed angular relation in the vertical direction between the input and output beams. The angle of tilt of the scanning wheel segment does not affect the vertical output angle but only the vertical displacement of the beam, as will be described.

The scanning wheel 102 is mounted on a spindle or shaft 130 which is supported for rotation in bearings 132,134 mounted in a shaft housing 136. A drive motor 138 is mounted on the housing and coupled directly to the shaft. The motor may for example be a DC motor having field windings 139 and being capable of output speeds up to 10,000 rpm. An encoder wheel 140 is connected to the shaft and forms part of an optical sensor 142 for creating a chopped electrical signal indicative of the scanner wheel speed and orientation.

The scanning wheel and motor are supported by a mount 144 on table 38, with the axis of rotation of the scanning wheel in a plane common to the optical axis of the output objective lens and the axis of the input beam. Roof mirrors 110,112 are adjusted so that their surface vectors (i.e., vectors perpendicular to the surfaces of the mirrors) also lie in this plane.

As shown best in FIGS. 2-4, the scanning wheel front reflective surfaces conform to a pyramid in shape. For convenience of manufacture the wheel is cut and machined from a circular disc. The scanning wheel pyramid is preferably a regular triangular pyramid having an axis of symmetry and apex (imaginary) located along the axis of rotation. As shown, the apex portion is flatted at 120a so that the wheel is technically a frustrum of a pyramid, but this truncation is not material to the invention. The pyramid thus defines a plurality of at least three reflective side segments which are identical and which are disposed symmetrically about the axis of rotation. Each of these segments is provided with a very accurately formed planar reflective surface. Typically, the disc is fabricated of aluminum or beryllium and is machined to form mounting surfaces for the reflective elements. These elements are accurately formed optical flats which are secured to the machined surfaces of the disc by a suitable cement. It is important that each segment be optically flat to a high degree of accuracy, since the input and output reflections from the segment will generally not be at the same position on each reflective segment as the wheel rotates.

Each segment defines a plane in space which is tilted at a small acute angle, e.g., 6 degrees, with respect to a plane perpendicular to the axis of rotation of the wheel. Since the segment passes through the beam's path, the effect is one of passing a plane through the path with the plane varying in angle of orientation to the path. Since each segment of a triangular mirror is limited to 120 degrees, the variation in the orientation of the plane passes from a minimum at one side through a maximum to a minimum on the other side; that is to say, the normal vector of each segment starts by making a maximum horizontal angle of deviation to the symmetry plane, passes through a null and proceeds to a maximum angle on the other side. Thereafter, the part line 146 between two adjacent segments passes through the beam path (dead time), and the process is repeated. The trace produced by each successive segment travels in the same direction from one side of the system to the other.

Thus, as illustrated in FIG. 10, the beam 66 is deflected at 150 by turning mirror 80 into a further series of reflections:

(a) a first reflection from the wheel segment 104 at 152,
 (b) a reflection from the upper mirror 110 of the roof doublet at 154,
 (c) a reflection from the lower mirror 112 of the roof doublet at 156, and
 (d) a second reflection from the wheel segment 104 at 158, at which point the beam has been routed through vertical angles totaling 360 degrees and has been vertically displaced so as to emerge between the roof mirrors 110 and 112 and through the objective lens 82 in a direction parallel to the path of travel of beam 66 into turning mirror 80.

Each reflection by segment 104,106 or 108 actually introduces four possible deviations of the beam: a horizontal angular deviation, a vertical angular deviation, a horizontal displacement, and a vertical or height displacement. Upon consideration it will be found that in order to produce an accurate scan line tracing a straight path in the plane of focus of the objective lens 82, the only requirement of these deviations is that the vertical angular component be constant and invariable while the horizontal angular component progresses from side to side in a repeating pattern. How this is done is best understood by reference to FIG. 9.

FIG. 9 illustrates that no change in the vertical angle of a beam passing through a 90-degree roof mirror doublet M-1,M-2 is produced by a change in the angle of tilt of a reflector R which serves both as input and output to the roof mirror. It is a known property of the roof mirror doublet itself that the input beam defines the angle of the output beam unambiguously. For example, with a 90-degree roof mirror doublet, the beam will be reflected out of the doublet at exactly the same angle as it enters in a plane perpendicular to the line of intersection of the roof mirrors. This is true regardless of the angle of tilt of the reflector, provided the reflector is perfectly planar and serves both as an input reflector and an output reflector to the roof mirror system. Because of the inversion as the beam passes through the roof mirrors, the angular component of tilt of the input reflector is cancelled exactly, although a displacement or height error V will occur. Since the wheel segments 104,106,108 are flat, the vertical angle of the output beam in the invention remains invariable with respect to the input beam and precisely so even though the input-/output reflecting segment 104,106 or 108 introduces vertical height displacement as well as horizontal angular and position displacements. However, since the beam is aligned vertically with respect to the objective lens and contains no change in vertical angular component, it traces a straight line at each focal plane.

The foregoing is true even under very loose tolerances for segment-to-segment accuracy, bearing accuracy of the spindle or shaft mounting, vibration and other variables to which the rotating wheel is subject. The sole rigid and absolutely precise requirement is flatness of each reflective segment of the scanner wheel.

The three-dimensional character of the motion of the beam during scanning can be visualized by reference to the perspective view of FIG. 10. The beam segments are labelled and characterized as follows:

160—stationary beam following reflection by turning mirror 80,
 162—horizontal and vertical deviation added by first reflection from wheel,
 164,166—roof doublet reflection adding vertical and horizontal displacements,
 168—vertical angle removed, horizontal angle doubled, vertical and horizontal displacement increased.

FIG. 11A shows the pyramidal mirror segment 104 at its mid-position, which is also the position of maximum vertical deflection. FIG. 11B shows the beam being routed by the roof mirrors back to segment 104 nearly on top of the input beam for its second reflection from that segment before being passed between the mirrors in and out of the system. FIGS. 12A–12C and 13A–13C show the segment in progressively moved positions, first turned slightly and then progressing toward the limit of movement to one side. These figures also show the progression in the horizontal angular deviation, the horizontal displacement and slight vertical displacement of the beam as the mirror segment moves, while also indicating that no vertical angular deviation is created. These figures also show an interesting phenomenon in that the vertical displacement causes the second reflection from the scan wheel segment to follow the moving reflective segment through its circular path of rotation, thereby avoiding the possibility of the beam walking off the reflective segment laterally.

Both the horizontal and vertical displacements of the beam are controlled by the angle of tilt of pyramidal mirror segments 104,106 and 108. In fairly long focal length systems, as generally, described herein, the horizontal sweep angle desired is about 13 degrees, and the apex angle of the pyramidal mirror is such that each surface of that mirror is inclined relative to a plane normal to the axis of rotation or axis of symmetry by an angle on the order of 6 degrees. The pyramid apex angle is the angle between the side of a regular pyramid having an even number of sides, e.g., a square or regular pyramid. For pyramids having an odd number of sides, the apex angle is twice the angle between one of the sides and the axis of symmetry of the pyramid. Should a greater throw be desired, redesign of the component locations and an increase in this angle will provide a greater horizontal angular deflection. In this connection, it is also possible to built the scanning wheel with means (not shown) for adjusting the angle of tilt of the facets. At least for small changes, this would have the effect of varying or changing the horizontal scan width over a limited range, which could be very useful in certain applications. If changes in scan width greater than a certain amount were required, the angles and positioning of the mirror doublet would also be changed.

By way of example, one scanner constructed in accordance with the present invention had the following dimensional and other characteristics:
(a) angle of introduction to segment 104 and first reflection from segment 104 in plane of symmetry = 30°,
(b) mirror doublet angle = 55.8°,
(c) pyramidal mirror apex angle = 2(90° − 6°) = 168° for a segment tilt of 6° with respect to a plane normal to the axis of rotation,
(d) diameter of wheel 102 = 8 inches,
(e) angle of total reflection through scanning system = 360°,
(f) rotational speed up to 10,000 rpm or 500 traces/sec.

At high rotational speeds it is desirable to provide a wind shroud 170 surrounding all portions of the wheel except for a small front-facing port 171 which permits the beam to enter and exit on each reflection, as illustrated in FIG. 2.

It is a particular advantage of the invention that the scan wheel can be cut from a circular disc. It is evident that a circular disc having an accurately machined and aligned mounting to the shaft of its rotational support is desirable for vibration-free operation. Achieving this result in circular configuration is relatively easy, and careful manufacture of the wheel and rotating parts will result in a substantially symmetrical mass distribution about the axis of rotation and permit high degrees of dynamic balance of the rotational elements.

If carried through its entire circle of rotation, each segment actually traces a sinusoidal angle of impingement with respect to the axis of the beam as delivered to the wheel from mirror 80. Only a portion of this 360-degree cycle is utilized, namely, a 120-degree portion which represents a substantially linear change in the angle of orientation relative to the beam and is generally symmetrical about the maximum angle of tilt presented to the beam.

While operating speeds up to 7,000 rpm have been suggested, the inherent design of the scanner of the invention permits envisioned operating speeds which may reach or even exceed 60,000 rpm. This would represent linear trace repetition times of up to 3,000 traces (scans) per second, which have heretofore been impractical in apparatus of this character. The trace times provided by the invention essentially eliminate the scanning element as the limiting structure in apparatus for the production of printing plates and the like. The scanning system of the invention has achieved many of the desirable advantages which are essential to a good scanner. Effectively, vertical wobble has been eliminated. While scan efficiencies of at least 75% are easy to obtain, the scan efficiency can be increased by increasing the diameter of the scanning wheel at least up to reasonable dimensional limits. The scanning is of single-direction character, and the velocity linearity for a three-segment wheel has been held, in the embodiment shown, well within acceptable limits. Scan times for conventional printing plates with typical raster scan advance speeds and the trace speeds provided by the invention are on the order of one minute, which is a necessary objective for any system for production of printing plates at high speed. As is evident, the cost of production of a system constructed in accordance with the invention is reasonable, since the only relatively critical tolerance is the tolerance of mirror flats. The entire system is reflective in character, totally eliminating refraction error in both single-beam and multi-beam operation. This feature enables the use of the system in multi-frequency operation where read and write beams of different frequencies are superimposed along a single beam path. In summary, by using the present invention, problems associated with lag errors, back-and-forth scanning, vertical wobble, frequency dependency and other disadvantages of prior systems are eliminated.

The system of the invention is also adaptable to facsimile operations such as disclosed in the co-referenced application previously referred to, or in other scanning systems, the angular position of the wheel being determined either by the design of the encoder disc or by spatial masking as may be required. In addition, the foregoing scanner lends itself readily to incorporation into flat-field scanning devices as shown in the present invention. The invention provides an output beam which is vertically precise and stable, and no vertical wobble compensation is required.

To those skilled in the art to which this invention pertains, many modifications and adaptations thereof will occur. For example, while there has been shown a three-sided frustrum of a regular triangular pyramid having a circularly cut disc-like base, changes in the pyramid apex angle, the number of sides (for example, four, five or more sides), and many design details of the scanning wheel may be made to adapt the invention to particular circumstances, format sizes or structures. Wheels having adjustable tilt angles have already been mentioned. All of such changes and modifications are within the scope of the invention. Additionally, while read/write laser plate production systems have been disclosed and described specifically and facsimile operation has been mentioned, it should be understood that this is for brevity of explanation. The scanner of the invention is also applicable to one-, two- or even multiple-beam systems such as may be used in multiple-station facsimile operation. It should be understood, however, that such modifications and adaptations are to be included within the scope of the invention and by definition in the scope of the subsequent claims, the specific embodiment disclosed and described herein being given for the purpose of illustration and not limitation on the invention.

What is claimed is:

1. In scanning apparatus for causing a laser beam to scan a line at an output plane in space: first mirror means forming a first planar reflective surface having a surface vector lying in a plane common to said beam, second mirror means forming a second planar reflective surface having its surface vector lying in the common plane, said first and second mirror means being disposed relative to ech other to form a reflective doublet about a line perpendicular to said common plane, a pyramidal mirror having a plurality of reflective segments inclined at an acute angle relative to a plane perpendicular to the axis of the mirror, and means for rotating said mirror about its axis to move said segments successively through the path of the beam so that the beam is reflected from the segment in the path to the doublet and back to the same segment for further reflection by that segment along an output path with a varying component of angular deviation perpendicular to the common plane and substantially no component of angular deviation parallel to the common plane.

2. Apparatus as in claim 1 in which said pyramidal mirror is formed on the axial face of a scanning wheel.

3. Apparatus as in claim 2 in which the wheel has a generally circular base.

4. Apparatus as in claim 2 in which said wheel is substantially balanced about the axis of rotation.

5. Apparatus as in claim 1 in which said first and second mirror means are spaced apart and the beam passes between the same in passing along the output path.

6. Apparatus as in claim 1, further including an objective lens for focusing the output beam to a small spot at the output plane.

7. Apparatus as in claim 6 in which said lens forms a flat field at said output plane.

8. Apparatus as in claim 1 wherein the mirror segments are disposed symetrically about the axis of the mirror.

9. Apparatus as in claim 1 in which each of said segments has a highly accurate flat reflecting surface.

10. Apparatus as in claim 1 in which the apex angle of the pyramidal mirror is only slightly less than 180°.

11. Apparatus as in claim 1 in which the surfaces of the reflective segments are inclined at an angle on the order of 6° relative to a plane perpendicular to the axis of rotation.

12. Apparatus as in claim 1 in which the total angle of reflection of the beam by the reflective segment and the mirror doublet is such that the beam emerges from the apparatus in a direction generally parallel to the input path.

13. Apparatus as in claim 1 further including a photosensitive surface positioned to be scanned by the beam in said output plane.

14. Apparatus as in claim 1 further including a printing plate positioned in the output plane and having a surface to which the beam is actinic.

15. Apparatus as in claim 7 further including a flat printing plate positioned in the output plane.

16. Apparatus as in claim 1 in which said means for rotating the pyramidal mirror comprises a motor capable of output speeds in excess of 4000 rpm.

17. Apparatus as in claim 1 in which said pyramidal mirror has sides conforming to a regular triangular pyramid and forming three reflective segments disposed symmetrically about the axis.

18. In laser read/write apparatus for causing a read laser beam to scan input copy and for causing a write laser beam to simultaneously scan an exposure plate: means for forming a read laser beam, means for forming a write laser beam, means for aligning and combining said beams along a collimated beam path in space, a first scan station for receiving copy to be scanned by said read beam, means for sensing light reflected from said copy during scanning by the read beam, a second scan station for receiving a light sensitive plate, beam splitter optics for separating said read and write beams and directing the same toward respective ones of the scan stations, means forming a reflective mirror doublet, a rotatable scanning wheel having a planar reflective surface arranged to pass through the path of the combined beams for intercepting the same and deflecting the same for successive reflection to the surfaces of said doublet and for receiving the output of said doublet for an additional reflection toward the beam splitter optics, the reflective surface of the scanning wheel being inclined to the axis of rotation so as to introduce a component of angular horizontal deviation which shifts the beam simultaneously and progressively from one side to the other across the copy and plate surfaces with no component of vertical angular deviation.

19. Apparatus as in claim 18 further including an objective lens receiving the beam after the additional deflection from the scanning wheel and focusing said deflected beam onto the copy and plate surfaces.

20. Apparatus as in claim 19 in which said lens is a flat field lens, and said copy and said exposure plate lie in flat planar surfaces.

21. Apparatus as in claim 18 in which the reflective surface of the scanning wheel is a precisely formed optical flat.

22. The apparatus of claim 18 wherein the scanning wheel has a generally pyramidal shape with a plurality of reflective surfaces inclined at an acute angle to a plane perpendicular to the axis of rotation.

23. In scanning apparatus: a pyramidal mirror having a plurality of reflective surfaces inclined at an acute angle relative to a plane perpendicular to the axis of the mirror, means for rotating the mirror about its axis to move the reflective surfaces successively through the path of a beam to provide a varying deflection of the beam from each successive surface of the mirror as that surface moves through the path and presents a varying angle of incidence to the beam, said deflection having components along first and second axes perpendicular to the mirror axis and to each other, and optical means for receiving the deflected beam from each successive surface and returning an image of the beam inverted about the first axis to the same surface for further reflection by that surface along an output path with a varying component of angular deviation along the first axis and substantially no component of angular deviation along the second axis.

24. The apparatus of claim 23 wherein the mirror is in the form of a triangular pyramid with three reflective surfaces disposed symmetrically about the axis of the mirror.

25. The apparatus of claim 23 wherein the reflective surfaces are inclined at an angle on the order of 6° to the plane perpendicular to the axis.

26. The apparatus of claim 23 wherein the optical means comprises a roof mirror doublet.

27. In a mirror for use in scanning apparatus having a horizontally extending roof mirror doublet cooperating with said mirror to provide an output beam for scanning of an output medium: a scanning wheel rotatable about its axis with a plurality of reflective surfaces on one axial face thereof, said reflective surfaces being arranged in the form of a pyramid having an apex angle on the order of 168° and a height substantially less than the diameter of the wheel and presenting a variable angle of incidence to the beam impinging thereon for deflecting the beam into the roof mirror doublet with horizontal and vertical components of angular deviation and receiving a vertically inverted image of the beam back from the doublet for reflection toward the output medium with a varying component of horizontal angular deviation and substantially no vertical angular deviation.

28. In scanning apparatus: a scanning wheel rotatable about its axis with a plurality of mirror surfaces on one axial face thereof, said mirror surfaces being arranged in the form of a pyramid having an apex angle on the order of 168° and a height substantially less than the diameter of the wheel, means for combining reading and writing beams and directing the combined beams toward the scanning wheel for reflection by successive ones of the mirror surfaces, and means for separating the beams after reflection by the mirror surfaces and directing the respective beams toward reading and writing surfaces.

29. The apparatus of claim 23 wherein the mirror comprises an axially rotatable scanning wheel having a circular base with a plurality of reflective surfaces arranged in the form of a pyramid on one side thereof, said pyramid having an apex angle on the order of 168° and a height substantially less than the diameter of the wheel.

* * * * *